May 24, 1960 R. W. TACCONE 2,937,421
MACHINE FOR MAKING MOLDS FOR CENTRIFUGAL CASTINGS
Filed Dec. 12, 1958 3 Sheets-Sheet 1

INVENTOR.
RUSSELL W. TACCONE
BY
Charles L. Lorenbeck
attorney

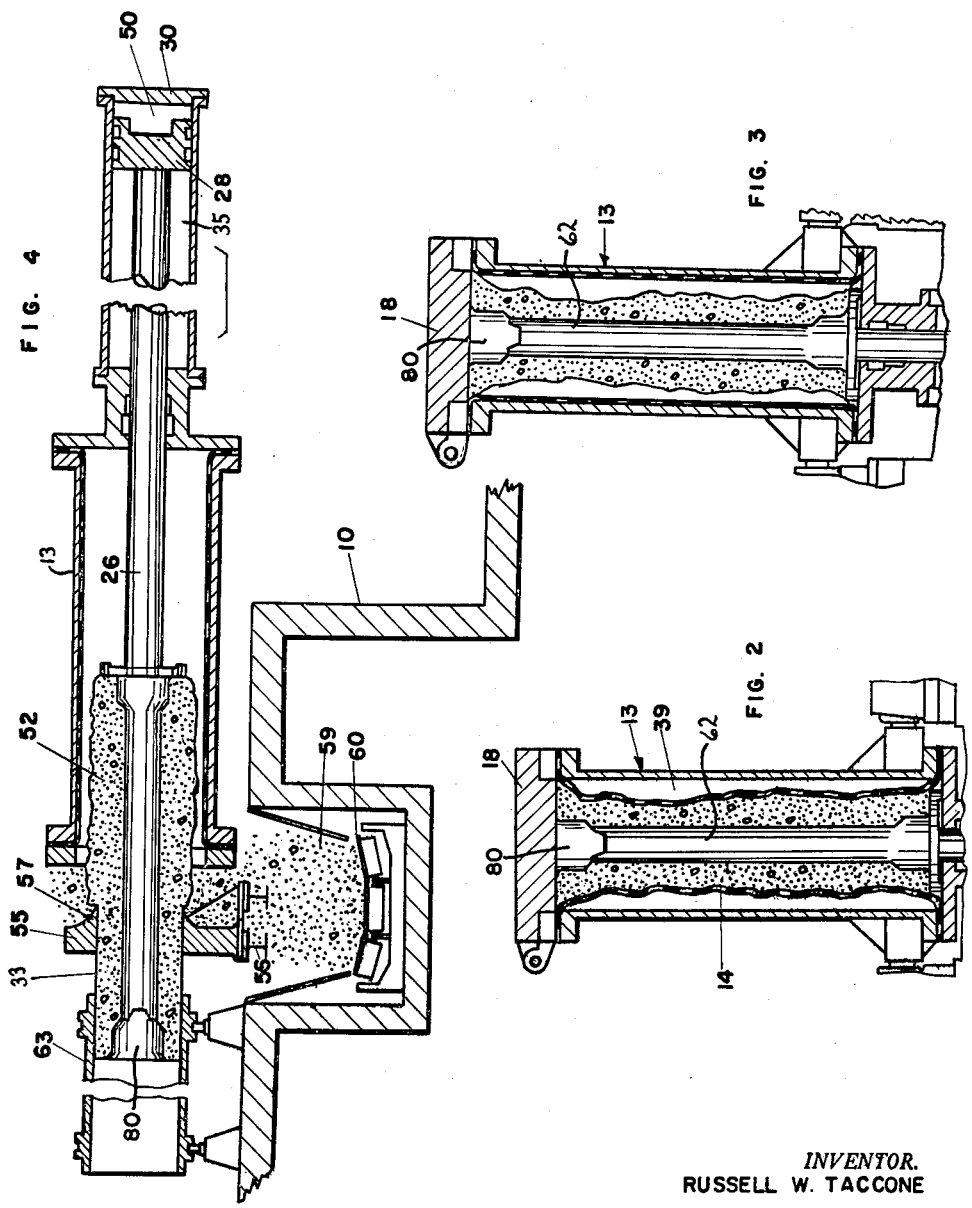

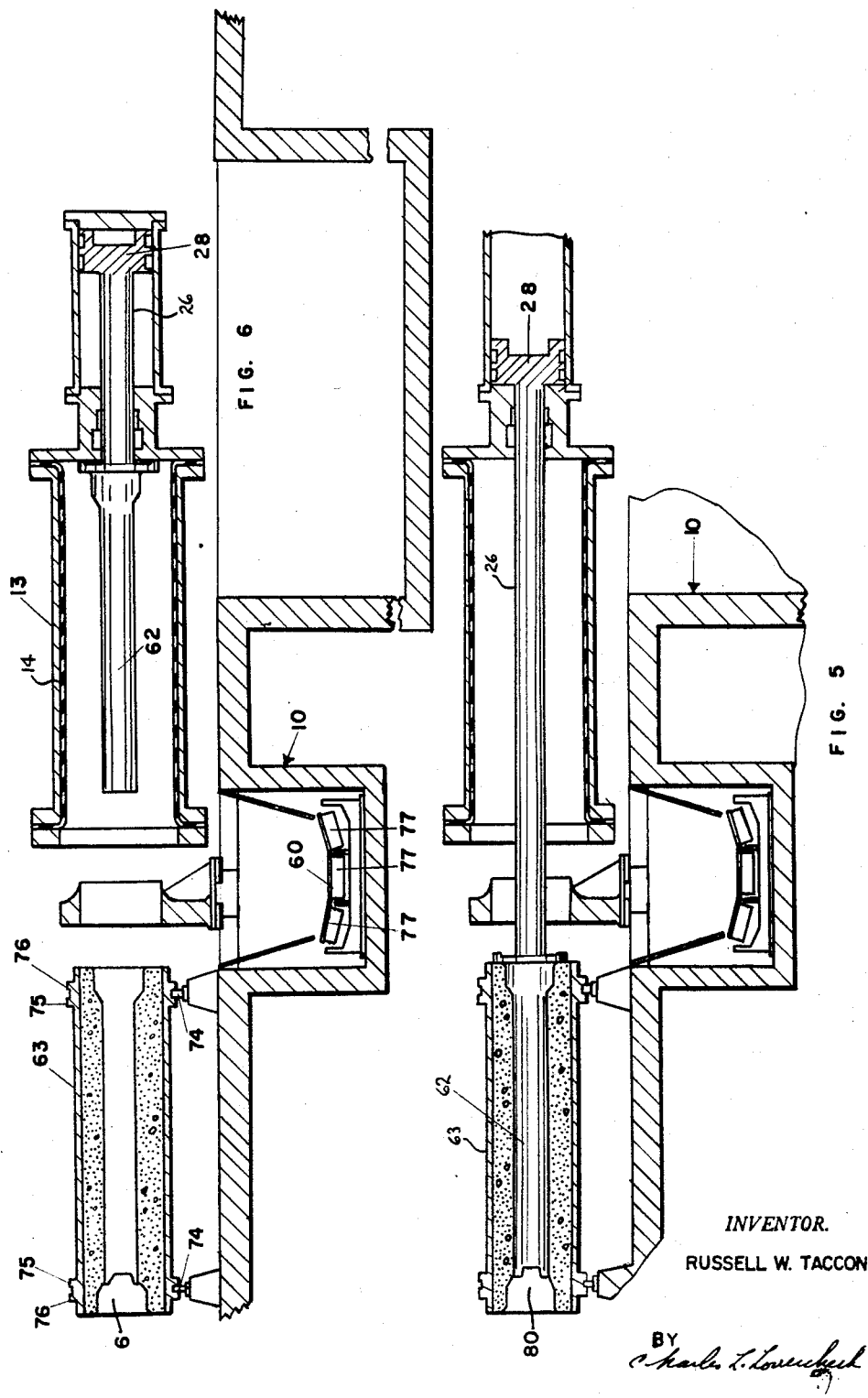

United States Patent Office 2,937,421
Patented May 24, 1960

2,937,421

MACHINE FOR MAKING MOLDS FOR CENTRIFUGAL CASTINGS

Russell W. Taccone, Erie, Pa., assignor to Taccone Pneumatic Foundry Equipment Corporation, North East, Pa., a corporation of Pennsylvania Filed Dec. 12, 1958, Ser. No. 780,145

15 Claims. (Cl. 22—16)

This invention relates to machines for making molds and, more particularly, to machines for making molds for centrifugal castings.

In the manufacture of soil pipe and other cast iron pipe made by the process generally known as centrifugal casting, it is necessary to provide a mold which has an inside surface; that is, a facsimile of the outside surface of the pipe to be cast. Various methods have been provided for making such a mold; however, most of these methods are slow to carry out and are frequently inconvenient and laborious.

It is, accordingly, an object of this invention to provide a machine for manufacturing molds for centrifugal casting and, more particularly, it is an object of the invention to provide a machine which is simple in construction, economical to manufacture, and simple and efficient in operation.

Another object of the invention is to provide an improved machine for manufacturing molds for centrifugally casting soil pipe.

A further object of the invention is to provide an improved machine for manufacturing molds for cylindrical objects wherein the machine utilizes an improved principle for forming the molds.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 2 is a partial view of the machine shown in Fig. 1 showing the diaphragm inflated and in compressing relationship on the sand in the mold;

Fig. 3 is a view similar to Fig. 2 showing the diaphragm deflated after having compressed the sand on the pattern;

Fig. 4 is a view similar to Fig. 3 showing the mold swung ninety degrees with the mold partly pushed through the strike off into the flask;

Fig. 5 is a view similar to Fig. 4 showing the mold forced into the flask with the pattern still in place; and Fig. 6 is a view similar to Fig. 5 showing the pattern removed from the mold and the mold ready to be moved to a centrifugal casting machine for use therein.

Figure 1:
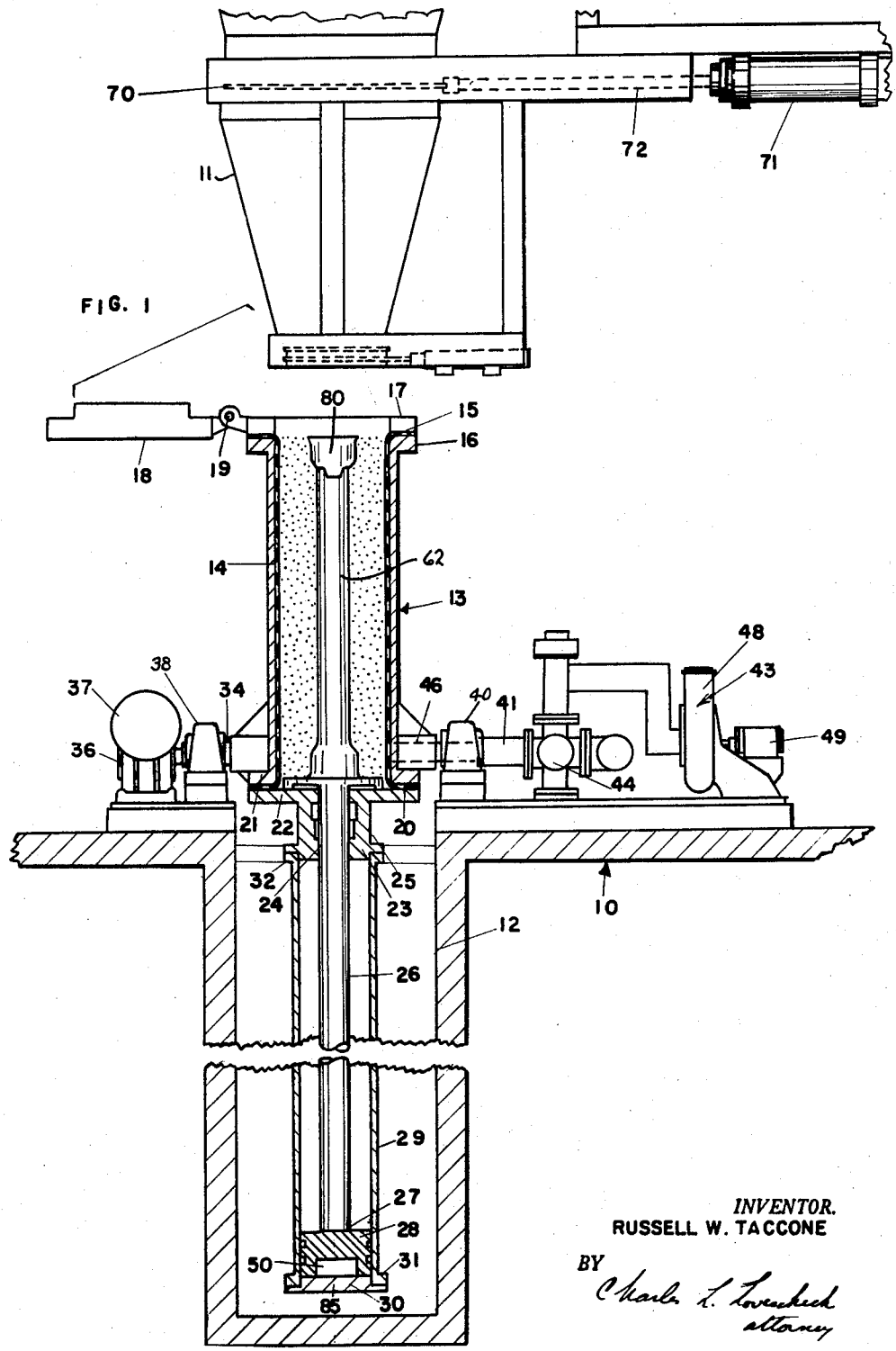
Fig. 1 is a lateral cross sectional view of a machine for making molds according to the invention.

Now with more specific reference to the drawings, a molding machine 10 is shown having a loading hopper 11, a sand sump 12, and a diaphragm containing cylinder 13 with a flask support or diaphragm 14.

The diaphragm 14 is a tubular flexible rubber sleeve whose first end 15 is bent back over a peripheral flange 16 on the cylinder 13 and is clamped thereto by means of a clamping ring 17 in a suitable manner. The clamping ring 17 has a cover 18 hingedly attached thereto at 19 and is shown in Fig. 1 in open position and in Figs. 2 and 3 in closed position. The cover 18 serves to hold the sand in position in the diaphragm 14 during the time that pressure is being applied as shown in Fig. 2 so that a flat end is provided on the mold.

A second end 20 of the diaphragm 14 is clamped to a flange 21 by means of a flange 22 of a head 23. The head 23 has an opening 24 therethrough with a stuffing box 25 which receives a piston rod 26. The piston rod 26 is attached at 27 to a piston 28. The piston 28 slides in a cylinder 29 which will have a source of compressed air connected through an end member 30 which is attached to a flange 31 of the cylinder 29. An end 32 of the cylinder 29 is attached to the head 23 and is rigid thereto. The compressed air flows through an opening 85 into a space 50.

The diaphragm 14 and the cylinder 29 are swingably supported on a shaft 34 which is pivotally mounted in bearings 38 and 40 and is swung from the position shown in Fig. 1 ninety degrees to the position shown in Fig. 4 by means of a gear motor 36 which is attached to the shaft 34 to drive the shaft 34 through a reducing mechanism 37 on the motor 36.

When compressed air is introduced through a pipe 41, the diaphragm 14 may be moved inwardly away from the inner surface of the mold cylinder 13 as shown in Fig. 2, thereby compressing the sand therein. A space 39 between the inner periphery of the cylinder 13 and the diaphragm 14 is connected to the outlet pipe 41 which in turn communicates with an evacuating pump 43 and a compressed air source 44. Therefore, the evacuating pump 43 may be connected to the space 39 through a suitable valve mechanism by way of the pipe 41 which communicates therewith through an aperture 46 and the diaphragm 14 will be drawn to the position shown in Fig. 1. Then after the sand is put in place as shown in Fig. 1, pressure may be applied through the source 44 to inflate the diaphragm 14 and thereby compress the sand around a pattern 62 as shown in Fig. 2. Then when the air from around the diaphragm 14 is exhausted and the vacuum is applied through the pump 43 which has a fan 48 thereon driven by a motor 49, the diaphragm 14 will be drawn away from the sand as shown in Fig. 3, leaving the compressed sand disposed around the pattern 62. If a suitable resilient diaphragm is used, the evacuating pump 43 could be dispensed with; however, in this case, the speed of production of the machine would be reduced.

When the mold cylinder 13 is swung to the position shown in Fig. 4, the mold cylinder 13 will be in alignment with a flask 63 and air from a suitable source may be admitted to the space 50 between the piston 28 and the end member 30 and the piston rod 26 thereby forced toward the left. A sand mold 52 which has previously been formed around the pattern 62 as shown in Figs. 2 and 3 will move through a strike off ring 55 which is supported on a suitable structure 56. A cutting edge 57 on the strike off ring 55 will shave the outside of the sand to smooth cylindrical shape and the sand thereby removed will drop as shown at 59 onto a conveyor 60 and, thereafter, it will be conveyed to a suitable repository. A smooth surfaced portion 33 of the mold 52 thereby formed will move into the flask 63 as shown in Fig. 4.

The piston rod 26 will continue to move the mold into the flask 63 until the mold is completely in the flask 63 as shown in Fig. 5. Then the compressed air will be shut off to the space 50 and introduced to a space 35. The piston 28 and the piston rod 26 will thereby pull the pattern 62 from a separable pattern piece 80 and from the mold to the position shown in Fig. 6. The piece 80 may be removed from the opposite end. The pattern 62 will then be in position inside the molding cylinder 13 and ready to be swung ninety degrees to its original position shown in Fig. 1. The sand from the loading hopper 11 may be dropped by means of a shut off gate 70 by applying compressed air from a suitable source to a cylinder 71 whereby a piston therein attached to a piston rod 72 will move the gate 70 to open position and allow sand to fall through the hopper 11 into the diaphragm containing cylinder 13 until it is full and the cover 18 can then be closed and the machine 10 ready for another cycle. The separable pattern piece 30 can thereafter be removed and repositioned on the pattern 62 as in Fig. 1.

A completed mold in the flask 63 can then be rolled along the track to the repository where molten metal will be poured thereinto. The flask 63 has peripheral flanges 75 and 76 thereon which guide the flask 63 on a track 74. The conveyor 60 may be of any suitable type of travelling conveyor or belt conveyor supported on suitable rolls 77.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A molding machine comprising a molding cylinder supported on said machine, a tubular diaphragm made of flexible material and disposed in said molding cylinder, the ends of said tubular diaphragm being attached to the ends of said molding cylinder, a pattern disposed in said molding cylinder, a flask, said molding cylinder being disposed in alignment with said flask, means to apply pressure to said diaphragm whereby said diaphragm is forced against the surface of sand adapted to be disposed in said molding cylinder, compressing said sand into engagement with said pattern, and means to force said compressed sand into said flask.

2. The machine recited in claim 1 wherein said molding cylinder has means thereon to support it in a vertical position for filling it with said sand, and means to swing said cylinder from a vertical position to a horizontal position whereby it is in alignment with said flask.

3. The machine recited in claim 2 wherein a ring like strike off member is disposed concentric to said pattern between said flask and said molding cylinder, said strike off member being adapted to engage said sand after it is compressed whereby the outer portion of said sand is removed, leaving an outside surface substantially equal in size to the inside of said flask, whereby said compressed sand may be forced into said flask.

4. The machine recited in claim 3 wherein means is attached to said pattern to force said pattern with said compressed sand thereon into said flask and said means withdrawing said pattern from said flask.

5. The machine recited in claim 4 wherein said means to force said diaphragm into engagement with said sand comprises a source of compressed air.

6. The machine recited in claim 5 wherein vacuum means is provided to retract said diaphragm from engagement with said sand.

7. The machine recited in claim 2 wherein means is provided to deposit sand into said mold cylinder.

8. A molding machine comprising a molding cylinder supported on said machine, a pattern disposed in said molding cylinder, a flask, said molding cylinder being disposed in alignment with said flask, means to apply a pressure to the surface of sand adapted to be disposed in said molding cylinder whereby said sand is compressed into engagement with said pattern, and means to force said compressed sand with said pattern therein into said flask.

9. A molding machine comprising a molding cylinder, said molding cylinder being swingably mounted on said machine, means to support a cylindrical flask, flask means supported on said flask support means, said molding cylinder being swingable from a vertical position for filling with sand to a horizontal position in alignment with said flask supported on said flask supporting means, a strike off means supported between said molding cylinder and said flask, said molding cylinder being of substantially larger diameter than said flask, a pattern disposed in said molding cylinder, a tubular diaphragm disposed in said molding cylinder, means to deposit sand in said diaphragm around said pattern, means to insert compressed air into said diaphragm to force said diaphragm into engagement with said sand to pack said sand around said pattern, and means to force said pattern with said sand thereon into operative engagement with said strike off means and into said flask.

10. The machine recited in claim 9 wherein said means to force said sand into said flask comprises a double acting cylinder with a piston therein, said pattern being attached to said piston.

11. The machine recited in claim 10 wherein said means to support said flask comprises a track, and flange means on the periphery of said flask guiding said flask in rolling engagement with said track.

12. The machine recited in claim 9 wherein a sand conveyor is disposed below said strike off means whereby sand struck off from said compressed sand is returned to said means to deposit said sand in said molding cylinder.

13. The machine recited in claim 9 wherein said means to deposit sand in said molding cylinder comprises a sand hopper disposed above said molding cylinder.

14. The machine recited in claim 9 wherein said strike off means comprises a ring having a peripheral cutting edge facing said molding cylinder.

15. The machine recited in claim 14 wherein said ring has an inside dimension substantially equal to the inside diameter of said flask.

References Cited in the file of this patent

UNITED STATES PATENTS

| | | |
|---|---|---|
| 683,255 | Dimmick | Sept. 24, 1901 |
| 2,101,726 | Van Zijp | Dec. 7, 1937 |
| 2,598,554 | Johnston | May 27, 1952 |
| 2,864,136 | Taccone | Dec. 16, 1958 |